United States Patent [19]

Gutierrez et al.

[11] Patent Number: 4,936,866
[45] Date of Patent: Jun. 26, 1990

[54] LACTONE MODIFIED POLYMERIC AMINES USEFUL AS OIL SOLUBLE DISPERSANT ADDITIVES

[75] Inventors: Antonio Gutierrez, Mercerville; Robert D. Lundberg, Bridgewater, both of N.J.

[73] Assignee: Exxon Chemical Patents Inc., Linden, N.J.

[21] Appl. No.: 401,360

[22] Filed: Aug. 31, 1989

Related U.S. Application Data

[62] Division of Ser. No. 916,303, Oct. 7, 1986, Pat. No. 4,866,142.

[51] Int. Cl.$^5$ ............................................... C10L 1/22
[52] U.S. Cl. .................................... 44/62; 44/63; 44/71
[58] Field of Search ................................ 44/62, 63, 71

[56] References Cited

U.S. PATENT DOCUMENTS

| | | |
|---|---|---|
| 2,890,208 | 6/1959 | Young et al. . |
| 2,898,301 | 8/1959 | Mayhew et al. . |
| 3,025,323 | 3/1962 | Rose et al. . |
| 3,062,631 | 11/1962 | Thompson . |
| 3,169,945 | 2/1965 | Hostettler et al. . |
| 3,284,417 | 11/1966 | Hostettler et al. . |
| 3,373,112 | 3/1968 | Anderson et al. . |
| 3,381,022 | 4/1968 | Le Suer . |
| 3,436,462 | 4/1969 | Mayhew et al. . |
| 3,493,568 | 2/1970 | Levy et al. . |
| 3,522,179 | 7/1970 | Le Suer . |
| 3,832,367 | 8/1974 | Heiba et al. . |
| 3,892,806 | 7/1975 | Eckert et al. . |
| 4,062,786 | 12/1977 | Brois et al. . |
| 4,086,294 | 4/1978 | Koleske et al. . |
| 4,168,278 | 9/1979 | Smith et al. . |
| 4,234,435 | 11/1980 | Meinhardt et al. . |
| 4,247,671 | 1/1981 | Reitz et al. . |
| 4,261,871 | 4/1981 | Smith et al. . |
| 4,292,184 | 9/1981 | Brois et al. . |
| 4,362,635 | 12/1982 | Dhein et al. . |
| 4,379,914 | 4/1983 | Lundberg . |
| 4,388,471 | 6/1983 | Wollenberg . |
| 4,397,750 | 8/1983 | Chibnik . |
| 4,448,905 | 5/1984 | Lin et al. . |
| 4,450,281 | 5/1984 | Wollenberg . |
| 4,463,168 | 7/1984 | Lundberg . |
| 4,512,903 | 5/1985 | Bloch et al. . |
| 4,584,117 | 4/1986 | Wollenberg . |
| 4,585,566 | 4/1986 | Wollenberg . |
| 4,612,132 | 9/1986 | Wollenberg . |
| 4,614,603 | 9/1986 | Wollenberg . |
| 4,617,138 | 10/1986 | Wollenberg . |
| 4,624,681 | 11/1986 | Wollenberg . |
| 4,645,515 | 2/1987 | Wollenberg . |
| 4,647,390 | 3/1987 | Buckley, III et al. . |
| 4,663,062 | 5/1987 | Wollenberg . |
| 4,666,459 | 5/1987 | Wollenberg . |
| 4,666,460 | 5/1987 | Wollenberg . |
| 4,668,246 | 5/1987 | Wollenberg . |
| 4,741,848 | 5/1988 | Koch et al. . |
| 4,866,142 | 9/1989 | Gutierrez et al. ........ 525/333.7 |

FOREIGN PATENT DOCUMENTS

| | | |
|---|---|---|
| 612320 | 1/1961 | Canada . |
| 202024 | 11/1986 | European Pat. Off. . |
| 1054370 | 1/1967 | United Kingdom . |

*Primary Examiner*—William R. Dixon, Jr.
*Assistant Examiner*—Jerry D. Johnson
*Attorney, Agent, or Firm*—J. B. Murray, Jr.

[57] ABSTRACT

Hydroxyl terminated polymeric $C_5$–$C_9$ lactone adducts are made by reacting a $C_5$–$C_9$ lactone with the reaction product of a $C_2$–$C_{10}$ olefin polymer or a halogenated derivative thereof having a number average molecular weight of 300 to about 10,000, with an amine containing from 2 to 60 total carbon atoms and from 1 to 12 nitrogen atoms. The resulting adducts are useful per se as oil soluble dispersant additives. They are also useful in fuel and lubricating oil compositions, as well as in concentrates and additive packages.

23 Claims, No Drawings

LACTONE MODIFIED POLYMERIC AMINES USEFUL AS OIL SOLUBLE DISPERSANT ADDITIVES

This is a division, of application Ser. No. 916,303, filed 10/7/86, now U.S. Pat. No. 4,866,142.

RELATED U.S. APPLICATIONS

This application is related to the following applications filed by the inventors herein: Ser. No. 916,218, filed Oct. 7, 1986; Ser. No. 916,114, filed Oct. 7, 1986, now U.S. Pat. No. 4,866,139; Ser. No. 916,113, filed Oct. 7, 1986, now U.S. Pat. No. 4,866,140; Ser. No. 916,287, filed Oct. 7, 1986, now U.S. Pat. No. 4,866,135; and Ser. No. 916,217, filed Oct. 7, 1986, now U.S. Pat. No. 4,866,141. All of these related applications are expressly incorporated herein by reference in their entirety.

BACKGROUND OF THE INVENTION

FIELD OF THE INVENTION

This invention relates to oil soluble hydroxyl terminated additives useful in fuel and lubricating oil compositions, including concentrates containing said additives, and methods for their manufacture and use. The hydroxyl terminated additives are poly($C_5$-$C_9$ lactone) adducts which have been prepared by reacting a $C_5$-$C_9$ lactone with a polyalkylene amine having a number average molecular weight of from about 300 to about 10,000. The hydroxyl terminated products are effective as dispersants and HD additives.

PRIOR ART

Polyalkylene amines are well known lubricating additives. These agents act to keep sludge and varnish dispersed in engine oils and have been successful commercially.

It is also known that polymers of 6 to 10 membered lactones such as valerolactone or E-caprolactone can be prepared by reacting the lactone monomer with a hydroxyl or amine initiator. When reacting E-caprolactone, for example, the polymerization reaction may be illustrated by the following equations:

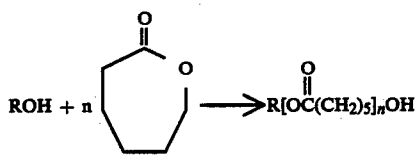

Eq. 1

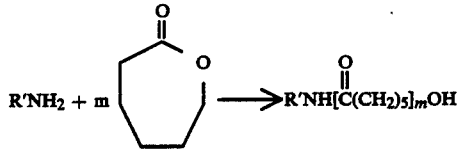

Eq. 2

The reactions are known to be catalyzed by various esterification catalysts such as stannous octanoate, and a variety of different molecular weight products are feasible depending upon the ratio of lactone to initiator. Molecular weights on the order of from a few hundred up to about 5,000 are reproducably achievable.

Caprolactone can also be polymerized to a very high molecular weight, e.g., on the order of 100,000 or more. Typically such high molecular weight polymers do not employ initiators and preservation of functionality is not a requirement.

It is also known to react a lactone such as E-caprolactone with a diamine wherein one of the amine groups is a tertiary amine and the other amine group is a primary or secondary amine to form a polymer having a terminal hydroxyl group and a terminal tertiary amine group. The polymeric products are useful for neutralizing polymeric acids.

It has now been found that improved oil soluble dispersant additives, useful in fuel and lubricating oil compositions, including concentrates containing the additives, can be prepared by reacting a 6 to 10 membered lactone with a polyalkylene amine, such as a polyisobutylene amine, having a number average molecular weight on the order of about 300 to about 10,000.

While there are a number of prior art disclosures relating to adducts of lactones and polyamines, to polyalkenyl amine lubricating additives and to lactone polymerization reactions, in general, little or no prior art of direct pertinence appears to have surfaced in regard to the present dispersants. Exemplary of the patent literature which relates to lactone polymerization processes and/or to oil soluble dispersant additives are the following U.S. Patents: U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycloaliphatic or aromatic carboxylic acids, and lactones of aliphatic $C_5$-$C_{12}$ hydrocarboxylic acids. The synthetic ester oils are suitable for the preparation of lubricants and lubricant compositions.

U.S. Pat. No. 2,890,208 discloses a process for polymerizing lactones to form lactone polyesters that are useful as plasticizers.

U.S. Pat. No. 2,898,301 discloses alkyl hydroxyamide lubricating fluid additives derived from monoamines, including polymerized fatty acid amines, and gamma-lactones such as gamma-butyrolactone.

U.S. Pat. No. 4,168,278 discloses adducts of primary amines, especially hydroxy amines, and caprolactam. The adducts are useful as depolymerization inhibitors. A similar disclosure is contained in U.S. Pat. No. 3,892,806, which relates to polycaprolactam adducts that are formed by reaction between an N-alkyl alkylene diamine and caprolactam. The adducts are useful as antimicrobial agents.

U.S. Pat. No. 3,832,367 discloses alkoxylated hydroxyamide detergents which are prepared by reacting a beta, gamma, delta or epsilon type $C_8$-$C_{40}$ lactone with an alkanolamide to form an intermediate hydroxyalkanolamide, and then reacting the intermediate hydroxyalkanolamide with an alkylene oxide.

U.S. Pat. No. 3,373,112 discloses lubricant additives derived from polyalkylene polyamines, including polyisobutylene polyamines and non-lactone acylating agents.

U.S. Pat. No. 3,062,631 discloses condensation products of beta-lactones, particularly $C_3$-$C_6$ betalactones, and amines as corrosion inhibiting additives.

U.S. Pat. No. 3,169,945 discloses the preparation of lactone polyesters which are useful as plasticizers and as intermediates for preparing elastomers and foams. The polyesters can be prepared by reacting a lactone such as E-caprolactone with an initiator such as an alcohol, amine or amino alcohol. A similar disclosure is contained in U.S. Pat. No. 3,284,417. This latter patent also discloses the use of a stannous octanoate polymerization catalyst U.S. Pat. No. 4,379,914 and its continuation-in-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized, sulfonated derivatives which can be combined with an alkyl benzene sulfonic acid to give a surfactant which contains ester groups, hydroxyl groups and amine-neutralized sulfonate groups.

U.S. Pat. No. 3,436,463 discloses N-substituted gamma hydroxycarboxylic acid amides which are useful as nematocides and insecticides. The compounds of this patent are prepared by reacting an organic primary amine with a lactone such as gamma-butyrolactone or gamma-valerolactone.

U.S. Pat. No. 4,397,750 teaches the preparation of hydroxy substituted pyrrolidone esters from butyrolactones and polyhydroxyamines. Corresponding hydroxyamide side-products are also disclosed. The disclosed esters are useful as additives for lubricants and fuels.

U.S. Pat. No. 3,493,568 discloses diol amides prepared from caprolactone and a monohydroxy amino alcohol. The diol amides can be cyclodehydrated to form oxazolines and oxazines which can be polymerized to yield crosslinked polymeric structures.

U.S. Pat. No. 4,512,903 discloses lubricant compositions containing amides of lactones, such as beta-propiolactone or gamma-butyrolactone, and fatty amines.

U.S. Pat. No. 4,234,435 discloses as oil additives, polyalkylene substituted dicarboxylic acids derived from poly-alkylenes having a $M_n$ of 1300 to 5000 and containing at least 1.3 dicarboxylic acid groups per polyalkylene. In Example 34 of that patent, a polyisobutene-substituted succinic acylating agent is reacted with caprolactam in the presence of mineral oil and sodium hydroxide. That patent also discloses lubricant additives derived from high molecular weight hydrocarbyl amines. The hydrocarbyl amines can prepared by reacting a chlorinated polyolefin having a molecular weight of at least about 400 with ammonia or an amine.

U.S. Pat. No. 3,381,022 relates to ester derivatives of substantially saturated polymerized olefin-substituted succinic acid wherein the polymerized olefin substitutuent contains at least about 50 aliphatic carbon atoms and has a molecular weight of about 700 to 5,000. The esters include the acidic esters, diesters, and metal salt esters wherein the ester moiety is derived from monohydric and polyhydric alcohols, phenols and naphthols. The ester derivatives are useful as additives in lubricating compositions, fuels, hydrocarbon oils and power transmission fluids. A related patent, i.e., U.S. Pat. No. 3,522,179, discloses lubricating compositions comprising a major amount of a lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrocarbon substituent may be derived from a polymerized lower monoolefin having a molecular weight of from about 700 to about 5,000.

All of the above discussed patents are expressly incorporated herein by reference in their entirety.

Additional exemplary prior art disclosures, which are expressly incorporated herein by reference in their entirety include U.S. Pat. Nos. 3,025,323; 4,062,786; 4,086,294; 4,247,671; 4,261,871; 4,292,184; and 4,448,905.

SUMMARY OF THE INVENTION

Despite the efficacy of prior art dispersant and oleaginous compositions, there is a need for more efficient and less costly dispersants which can either perform better, or perform well at lower dispersant levels. Accordingly, it is a principal object of this invention to provide novel lactone adduct based dispersants which are effective, and readily prepared under typical dispersant manufacturing conditions.

Another object is to provide a novel class of poly ($C_5$-$C_9$ lactone) adduct dispersants.

Another object is to provide a process for preparing efficient dispersants by reacting a $C_5$-$C_9$ lactone with a polyalkylene amine having a number average molecular weight of from about 300 to about 10,000.

A further object is to provide lubricant compositions and concentrates containing the novel $C_5$-$C_9$ lactone based dispersants of this invention.

Yet another object is to provide a novel class of oil soluble hydroxyl terminated adducts from polyalkylene amines and $C_5$-$C_9$ lactones, as well as lubricant compositions and concentrates containing such adducts.

Yet another object is to provide metal complexes and other post-treated derivatives, e.g., borated derivatives, of the novel $C_5$-$C_9$ lactone based dispersants of this inention, as well as lubricant compositions and concentrates containing such adducts.

The manner in which these and other objects can be achieved will be apparent from the detailed description of the invention which appears hereinbelow.

In one aspect of this invention, one or more of the above objects can be achieved by initiating the polymerization of a $C_5$-$C_9$ lactone by means of an amino function contained in a polyalkylene amine, such as polyisobutylene amine, wherein the polyalkylene amine has a number average molecular weight of about 300 to about 10,000.

In another aspect, one or more of the objects of this invention can be achieved by heating a $C_5$-$C_9$ lactone such as E-caprolactone at a temperature of at least about 50° C., and preferably from about 90° C. to about 180° C. with a polyalkylene amine initiator wherein the polyalkylene is characterized by a number average molecular weight of about 700–5,000; and, in a further aspect, one or more objects of this invention are achieved by providing poly ($C_5$-$C_9$ lactone) adducts produced by such a process.

One or more additional objects of this invention are achieved by reacting a molar excess of E-caprolactone with a polyisobutylene amine to form a hydroxyl terminated dispersant adduct which contains an amide group and a repeating sequence of ester groups between the amide group and the terminal hydroxy group; one or more additional objects of this invention can be illustrated in connection with the reaction between E-caprolactone and a polyisobutenyl amine initiator having available primary amine functionality as follows:

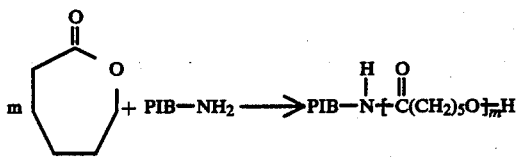

Eq. 3 where m has an average value of from about 0.2 to about 100, preferably from about 1 to about 20, most preferably from 1 to about 5, and PIB represents polyisobutylene having a number average molecular weight of from about 700 to about 5,000. The above polymerization can be conducted with or without a catalyst. However, it is preferred to employ a catalyst such as stannous octanoate in an amount of from about 50 to about 10,000 parts by weight of catalyst per one million parts by weight of total reaction mixture.

The novel poly($C_5$–$C_9$ lactone) adducts of this invention are useful per se as an additive, e.g., a dispersant additive, for example, in the same manner as disclosed in U.S. Pat. No. 3,219,666 where prior art derivatives of polyalkenyl succinic acids and nitrogen compounds are used as dispersant/detergents in lubricants, especially lubricants intended for use in the crankcase of internal combustion engines, gears, and power transmitting units. Accordingly, one or more objects of the invention are achieved by providing lubricating oil compositions, e.g., automatic transmission fluids, heavy duty oils suitable for use in the crankcases of gasoline and diesel engines, etc. containing the novel poly($C_5$–$C_9$ lactone) adducts of this invention. Such lubricating oil compositions may contain additional additives such as viscosity index improvers, antioxidants, corrosion inhibitors, detergents, pour point depressants, antiwear agents, etc.

Still further objects are achieved by producing concentrate compositions comprising from about 20 to about 80 wt. % of a normally liquid, substantially inert, organic solvent/diluent, e.g., mineral lubricating oil, or other suitable solvent diluent and from about 20 to about 80 wt. % of a ($C_5$–$C_9$ lactone) adduct, as mentioned above and described in more detail hereinafter.

THE POLYALKYLENE AMINE

The polyalkylene amines used in the invention include a long chain hydrocarbon, generally a polyolefin, substituted with 1 to about 12, preferably 1 to about 5 amino groups, preferably primary amino groups, per mole of polyolefin.

The preferred polyolefins are polymers comprising a major molar amount of $C_2$ to $C_{10}$, e.g., $C_2$ to $C_5$ monoolefin. Such olefins include ethylene, propylene, butylene, pentene, octene-1, styrene, etc. The polymers can be homopolymers such as polyisobutylene, as well as copolymers of two or more of such olefins such as copolymers of: ethylene and propylene; butylene and isobutylene; propylene and isobitylene; etc. Other copolymers include those in which a minor molar amount of the copolymer monomers, e.g., a copolymer of isobutylene and butadiene; or a copolymer of ethylene, propylene and 1,4-hexadiene; etc.

In some cases, the olefin polymer may be completely saturated, for example, an ethylenepropylene copolymer made by a Ziegler-Natta synthesis using hydrogen as a moderator to control molecular weight.

The olefin polymers usually will have a number average molecular weight ($M_n$) within the range of about 300 and about 10,000, more usually between about 700 and about 5,000. Particularly useful olefin polymers have a number average molecular weight within the range of about 900 and about 2,500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information. See W. W. Yau, J. J. Kirkland and D. D. Ely, "Modern Size Exclusion Liquid Chromatography", John Wiley and Sons, New York, New York 1979.

Processes for substituting the olefin polymer with amino groups are known in the art. For example, the olefin polymer can be first halogenated, for example, chlorinated or brominated to about 1 to 8, preferably 3 to 7 wt. % chlorine or bromine, based on the weight of polymer, by passing the chlorine or bromine through the polyolefin at a temperature of 100° to 250° C., e.g., 140° to 220° C. for about 0.5 to 10 hours preferably 1 to 7 hours. The halogenated polymer then may be reacted with sufficient alkyl amine at 100° to 150° C., usually about 140° to 180° C., for about 0.5 to 10, e.g., 3 to 8 hours, and neutralized with an alkaline hydroxide so that the product obtained will contain about 1 to 10, preferably 1 to 5 e.g., 2 moles of the primary amine per mole of the halogenated polymer. Processes of this general type are taught in U.S. Pat. No. 3,373,112 and others.

Alternatively, the olefin polymer, and the alkyl amine can be mixed and heated while adding chlorine to the hot material.

By the use of halogen, about 50 to 80 wt. % of the polyolefin, e.g., polyisobutylene normally will react with the alkyl amine material. Upon carrying out a thermal reaction without the use of halogen or a catalyst, then usually only about 5 to 10 wt. % of the polyisobutylene will react. Chlorination helps increase the reactivity.

Suitable amines for reaction with the polyolefin or halogenated polyolefin include monoamines and polyamines of about 2 to 60, e.g., 3 to 20, most preferably 3 to 10 total carbon atoms in the molecule. These amines may be hydrocarbyl amines or may be hydrocarbyl amines including other non-interfering groups, e.g., alkoxy groups, amide groups, nitrile groups, imidazoline groups, and the like. Preferred amines are aliphatic saturated amines, including those of the general formula:

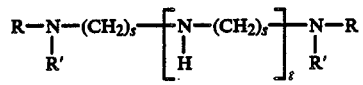

I where R and R' are independently selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, preferably 2 to 4; and t is a number of from 0 to 10, preferably 2 to 7. If t=0, then R or R' must be H such that there are at least 2 of either primary or secondary amino groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di(1,2-propylene) triamine; di-(1,3-propylene) triamine; N,N-dimethyl-1,3-diamino propane; N,N-di-(2-aminoethyl) ethylene diamine; N-dodecyl-1,3-propane diamine; di-, and tri-tallow amines; amino morpholines such as N-(3-aminopropyl) morpholine; etc.

Other useful amine compounds include: alicyclic diamines such as 1,4-di(aminomethyl) cyclohexane, and heterocyclic compounds such as imidazolines, morpholines, and N-aminolakyl piperazines of the general formula:

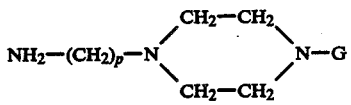
II wherein G is independently selected from the group consisting of hydrogen and omega-(nontertiary)aminoalkylene radicals of from 1 to 3 carbon atoms, and p is an integer of from 1 to 4. Non-limiting examples of such amines include 2-pentadecyl imidazoline, N-(2-aminoethyl) piperazine, etc.

Commercial mixtures of amine compounds advantageously may be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. A low cost mixture of poly(ethyleneamine) compounds averaging about 5 to 7 nitrogen atoms per molecule are available commercially under trade names such as "Polyamine H", "Polyamine 400:", "Dow Polyamine E-100", etc.

Useful amines also include polyoxalkylene polyamines such as those of the formulas:

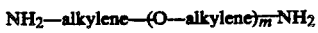
III where m has a value of about 3 to 70 and preferably 10 to 35; and

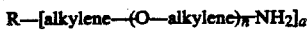
IV where n has a value of about 1 to 40 with the provision that the sum of all the n's is from about 3 to about 70 and preferably from about 6 to about 35, R is a substituted saturated hydrocarbon radical of up to 10 carbon atoms, wherein the number of substituents on the R group is represented by the value of "a", which is a number from 3 to 6.

The alkylene groups in either formula (III or IV) may be straight or branched chain containing about 2 to 7, and preferably about 2 to 4 carbon atoms.

The above polyoxyalkylene polyamines, preferably polyoxyalkylene diamines and polyoxyalkylene triamines, may have average molecular weights ranging from about 200 to 4,000 and preferably from about 400 to about 2,000. The preferred polyoxyalkylene include the polyoxyethylene and polyoxypropylene diamines and the polyoxypropylene triamines. The polyoxyalkylene polyamines are commercially available and may be obtained, for example, from the Jefferson Chemical Company, Inc. under the trade name "Jeffamines D-230, D-400, D-1000, D-2000, T-403", etc.

LACTONE CAPPING OF THE POLYALKYLENE AMINE

In an aspect of invention, the novel poly ($C_5$–$C_9$ lactone) adducts are prepared by polymerizing a lactone using at least one residual amine functionality on an amine substituted long chain hydrocarbon as the ring opening and polymerization initiator.

Useful lactone compounds for this process include lactones having at least five carbon atoms in the lactone ring, e.g. 5 to 9 carbon atoms. The lactones may be substituted or unsubstituted and the substituents, if any, may comprise, for example, alkyl, aryl, aralkyl, cycloalkyl, alkoxy or other groups which would not interfere with the ring opening reaction and adduct formation. The preferred lactones have no more than two substituent groups, and the more preferred lactones are unsubstituted.

Non-limiting examples of the useful lactone include delta-valerolactone, methyl-delta-valerolactone, E-caprolactone, methyl-E-caprolactone, dimethyl-E-caprolactone, methoxy-E-caprolactone, cyclohexyl-E-caprolactone, methylbenzyl-E-caprolactone, caprylolactone, methyl-caprylolactone, and the like, with E-caprolactone being particularly preferred.

The ring opening polymerization of the lactone by reaction with the amine substituted long chain hydrocarbon material may be carried out, with or without a catalyst, simply by heating a mixture of the lactone and material in a reaction vessel in the absence of a solvent at a temperature of from about 30° C. to about 200° C., more preferably at a temperature of about 75° C. to about 180° C., and most preferably about 90° C. to about 160° C., for a sufficient period of time to effect polymerization. Optionally, a solvent for the monomer and/or polymer can be employed to control viscosity and/or reaction rates.

In one preferred embodiment of the invention, the $C_5$–$C_9$ lactone is reacted with a polyisobutylene amine which has been prepared by reacting a polyisobutylene with an alkyl amine such as 1,3-diaminopropane, followed by neutralization with an alkali metal hydroxide, such as sodium hydroxide or potassium hydroxide. This reaction can be depicted by the following equation:

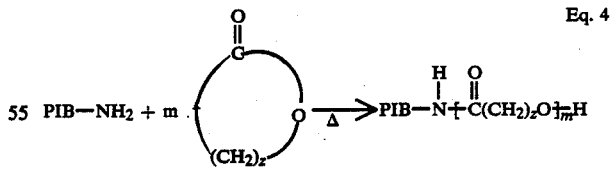

Eq. 4 where PIB represents polyisobutylene having a number average molecular weight of from about 700 to about 5,000, m is a number which has an average value of from about 0.2 to about 100, preferably from 1 to 20, and z is a number from 4 to 8.

Catalysts useful in the promotion of the above-identified reaction are selected from the group consisting of stannous octanoate, stannous hexanoate, stannous oxalate, tetrabutyl titanate, a variety of metal organic based catalysts, acid catalysts and amine catalysts, as described on page 266, and forward in a book chapter authored by R. D. Lundberg and E. F. Cox entitled, "Kinetics and Mechanisms of Polymerization: Ring Opening Polymerization"; edited by Frisch and Reegen, published by Marcel Dekker in 1969, wherein stannous octanoate is an especially preferred catalyst. The catalyst is added to the reaction mixture at a concentration level which is effective to ensure complete reaction of the lactone and polyisobutylene amine within about 3 to about 7 hours. Generally speaking, the catalyst is added to the reaction mixture at a concentration level of about 50 to about 10,000 parts of catalyst per one million parts by weight of total reaction mixture.

When initiating the polymerization of the lactone monomer under the conditions described herein, the lactone will react selectively first with primary amino groups present in the initiator molecule and form a polymer adduct containing a lactone ester group and a terminal hydroxyl group. In the absence of a catalyst, any excess lactone monomer will either react with a secondary amino group present in the initiator molecule or with the hydroxyl group formed via the reaction of the lactone with the primary amino group. In the presence of a catalyst, such as stannous octanoate, it is believed that the lactone preferably will react somewhat more rapidly with the terminal hydroxyl group than with a secondary amino group thus producing a polylactone ester adduct.

If the stoichiometry of the polyalkylene amine initiator is such that very few primary amino groups are available, secondary amino groups will be converted to polylactone adducts. The preference towards reaction with primary amino groups results in an added benefit in those applications where the presence of primary amino groups is considered to be deleterious to performance (such as in diesel dispersancy). In such cases, the present invention provides a means of replacing the deleterious amine group with an amide function and a desirable hydroxyl group.

In the reaction shown above, the average value of m or the degree of polymerization (DP) of the lactone monomer may vary depending upon the intended application. At DP's of much greater than about 10 the polylactone adducts can exhibit crystallinity; a characteristic which is undesirable in an oil soluble dispersant due to the consequent high viscosity, or even solid, oil products which can be obtained However, at lower DP's, oil soluble adducts possessing low viscosity and desirable sludge and varnish inhibition characteristics are obtained. Accordingly, regardless of the identity of the lactone and amine substituted long chain hydrocarbon material, the value of m, or the average degree of polymerization (DP) should be between about 0.2 and about 100, more preferably between about 1 and about 50, and most preferably between about 1 and about 20. For dispersant uses, a DP of about 1 to about 5 is particularly preferred.

Further aspects of the present invention reside in the formation of metal complexes and other post-treatment derivatives, e.g., borated derivatives, of the novel additives prepared in accordance with this invention. Suitable metal complexes may be formed in accordance with known techniques of employing a reactive metal ion species during or after the formation of the present $C_5$–$C_9$ lactone derived dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. Nos. 3,306,908 and Re. 26,433.

Post-treatment compositions include reacting the novel additives of the present invention with one or more post-reacting reagents, usually selected from the group consisting of boron oxide, boron oxide hydrate, boron halides, boron acids, sulfur, sulfur chlorides, phosphorous sulfides and oxides, carboxylic acid or anhydride acylating agents, epoxides and episulfides and acrylonitriles. The reaction of such post-treating agents with the novel additives of this invention is carried out using procedures known in the art. For example, boration may be accomplished in accordance with the teachings of U.S. Pat. No. 3,254,025 by treating the $C_5$–$C_9$ lactone derived additive compound with a boron oxide, halide, ester or acid. Treatment may be carried out by adding about 1–3 wt. % of the boron compound, preferably boric acid, and heating and stirring the reaction mixture at about 135° C. to 165° C. for 1 to 5 hours followed by nitrogen stripping and filtration, if desired Mineral oil or inert organic solvents facilitate the process.

THE COMPOSITIONS

The lactone derived additives of the present invention have been found to possess very good dispersant properties as measured herein in a wide variety of environments.

Accordingly, the lactone derived adducts are used by incorporation and dissolution into an oleaginous material such as fuels and lubricating oils.

When the dispersants of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The lactone derived dispersants find their primary utility in lubricating oil compositions which employ a base oil in which the additives are dissolved or dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalphaolefins, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cs. at 100° C.

Thus, the lactone derived additives of the present invention can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight, base oil, based on the concentrate weight.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors, oxidation inhibitors, friction modifiers, other dispersants, anti-foaming agents, anti-wear agents, pour point depressants, detergents, rust inhibitors and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, interpolymers of styrene and acrylic esters, and styrene/isoprene copolymers.

Corrosion inhibitors, also known as anticorrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U. S. Pat. No. 3,778,375 which discloses reaction products of a phosphonate with an oleamide; U. S. Pat. No. 3,852,205 which discloses S-carboxyalkylene hydrocarbyl succinimide, S-carboxyalkylene hydrocarbyl succinamic acid and mixtures thereof; U. S. Pat. No. 3,879,306 which discloses N-(hydroxyalkl) alkenyl succinamic acids or succinimides; U.S. Pat. No. 3,932,290 which discloses reaction products of di(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U. S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$-$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional anti-wear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Serial No. 235,920, filed Aug. 23, 1988, which is a continuation of Ser. No. 32,066, filed Mar. 27, 1987 now abandoned), which, in turn, is a continuation of Ser. No. 754,001, filed July 11, 1985 (now abandoned), the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Vol % | Wt % a.i. |
|---|---|---|
| Viscosity Modifier | .01-4 | .01-4 |
| Corrosion Inhibitor | 0.01-1 | .01-1.5 |
| Oxidation inhibitor | 0.01-1 | .01-1.5 |
| Dispersant | 0.1-7 | 0.1-8 |
| Pour Point Depressant | 0.01-1 | .01-1.5 |
| Anti-Foaming Agents | 0.001-0.1 | .001-0.15 |
| Anti-Wear Agents | 0.001-1 | .001-1.5 |
| Friction Modifiers | 0.01-1 | .01-1.5 |
| Detergents/Rust Inhibitors | .01-2.5 | .01-3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

This invention will be further understood by reference to the following examples, wherein all parts are parts by weight and all molecular weights are number average molecular weights unless otherwise noted, and which include preferred embodiments of the invention.

EXAMPLE 1

Preparation of Polyisobutylene-Amine

About 1250 g of a chlorinated polyisobutylene (4.2% Cl) of a number average molecular weight of 940 was charged into a 2 liter reaction flask. Thereafter, 400 g of 1,3-diaminopropane were added slowly and the reaction mixture was heated to 150° C. for 5 hours. The reaction mixture was cooled to room temperature and neutralized with sodium hydroxide (105.7 g at 50% solution). The water and excess amine were stripped off from the reaction flask and the residue was diluted in excess heptane. The heptane solution was filtered and rotoevaporated at 100° C. The product analyzed for 62.5% active ingredient and 1.68 wt. % nitrogen.

EXAMPLES 2-5

Lactone Capping of PIB-Amine

About 80 g (0.05 moles) of the PIB-Amine prepared in accordance with EXAMPLE 1 were mixed in a 2 liter reaction flask with 5.7 g (0.05 moles) of E-caprolactone and 0.05 g of stannous octanoate. The reaction mixture was heated to 140° C. for 3 hours. Infrared analysis of the reaction mixture indicated that the reaction was completed.

EXAMPLE 3

The procedure of EXAMPLE 2 was followed, except that 28.5 g (0.25 moles) of E-caprolactone were reacted with the PIB-Amine.

EXAMPLE 4

The procedure of EXAMPLE 2 was followed except that 57 g (0.5 moles) of E-caprolactone were reacted with the PIB-Amine.

EXAMPLE 5

The procedure of EXAMPLE 2 was followed except that 171 g (1.5 moles) of E-caprolactone were reacted with the PIB-Amine.

Table I, which follows summarizes the characteristics of the dispersant materials prepared in accordance with EXAMPLES 2-5.

TABLE I

| EXAMPLE | PIB, $M_n$[1] | Amine[2] | PIB-Amine/CL[3] |
|---|---|---|---|
| 2 | 940 | 1,3-diaminopropane | 1.0:1.0 |
| 3 | 940 | " | 1.0:5.0 |
| 4 | 940 | " | 1.0:10.0 |
| 5 | 940 | " | 1.0:30.0 |

[1] number average molecular weight of polyisobutylene (PIB)
[2] amine used to prepare PIB-Amine
[3] moles of PIB-Amine reacted with moles of E-caprolactone (CL)

SLUDGE INHIBITION AND VARNISH INHIBITION BENCH TEST

Samples of the polycaprolactone adducts prepared on accordance with EXAMPLES 2 and 3 were subjected to a standard sludge inhibition bench test (SIB) and a standard varnish inhibition bench test (VIB). The adduct prepared in accordance with EXAMPLE 4 (mole ratio of Cl to PIB-Amine of 10:1) showed some evidence of insolubility in the oil used to run the SIB and VIB tests and, therefore, was not tested. The adduct prepared in accordance with EXAMPLE 5 was even less soluble than that adduct prepared in accordance with EXAMPLE 4, and it too was not tested. A control sample (the PIB-Amine of EXAMPLE 1) also was tested to provide a basis of comparison between the polycaprolactone adducts of this invention and the corresponding prior art PIB-Amine dispersants.

The SIB and VIB tests forecast the performance of a lubricant in a gasoline engine. These tests are described below:

The SIB Test employs a used crankcase mineral lubricating oil composition having an original viscosity of about 325 SSU at 37.8° C. that has been used in a taxicab driven generally for shout trips only thereby causing a buildup of a high concentration of sludge precursors. The oil contains only a refined base mineral oil, a viscosity index improver, a pour point depressant an a zinc dialkyldithiophosphate anti-wear additive. The oil contains no sludge dispersants. Such used oil is acquired by draining and refilling taxicab crankcases at about 1,000-2,000 mile intervals.

The SIB Test is conducted in the following manner: The used crankcase oil is freed of sludge by centrifuging for one half hour at about 39,000 gravities (gs). The resulting clear bright red oil is then decanted from the insoluble sludge particles, However, the supernatant oil still contains oil-soluble sludge precursors which, under the conditions employed by this test, tend to form additional oil-insoluble deposits of sludge. The sludge inhibiting properties of the additives being tested are determined by adding to portions of the used oil 0.5 wt. %, on an active basis, of the particular additive being tested. Ten grams of each oil sample being tested is placed an a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the oil by decanting supernatant oil and then carefully washed with 15 ml of pentane to remove all remaining oils from the sludge. The weight, in milligrams, of the new solid sludge that forms in the test is determined by drying the residue and weighing it. The results are reported as milligrams of sludge per ten grams of oil, thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB Test, a test sample consisting of ten grams of lubricating oil containing 0.5 wt. %, on an active basis, of the additive being evaluated is used. The test oil is a commercial lubricating oil obtained from a taxi after about 2000 miles of driving with the lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance, air, is bubbled through the test samples and during the cooling phase, water vapor is bubbled through the test samples. At the end of the test period, which testing cycle is repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS sequence VD engine test, which test is well known in the automotive industry. The test is described in the ASTM Document for Multigrade Test Sequence for Evaluating Automotive Engine Oil, Sequence VD, Part 3 of STP 315H Table II, which follows, summarizes the compositions tested and the test results.

TABLE II

| SAMPLE TESTED | CL:PIB-Amine[1] | SIB[2] | VIB[3] |
|---|---|---|---|
| EXAMPLE 2 | 1:1 | 5.1 | 7 |

TABLE II-continued

| SAMPLE TESTED | CL:PIB-Amine[1] | SIB[2] | VIB[3] |
|---|---|---|---|
| EXAMPLE 3 | 5:1 | 9.91 | 5 |
| EXAMPLE 1 (PIB-Amine) | 0 | 7.40 | 8 |

[1] moles caprolactone per mole of polyisobutylene-amine
[2] mg sludge per 10 g oil (1 to 10, 1 the best)
[3] varnish rating - visually determined (1 to 11, 1 the best)

The data in Table II demonstrate that the varnish performance of the present polyisobutyl aminecaprolactone adducts is superior to that of the polyisobutylene amine control. The data also show that the sludge inhibition properties of the dispersants are enhanced when E-caprolactone is reacted with the PIB-Amine at a 1:1 ratio, but that slightly poorer, although still acceptable, sludge inhibition properties are obtained when the amount of E-caprolactone is increased to a 5:1 ratio.

As will be evident to those skilled in the art, various modifications on this invention can be made or followed, in light of the foregoing disclosure and illustrative examples, tables and discussion, without departing from the spirit and scope of the disclosure or from the scope of the invention as set forth in the following claims.

What is claimed is:

1. An oleaginous composition comprising an oleaginous fuel material and a hydroxyl terminated polymeric $C_5$-$C_9$ lactone adduct material, said hydroxyl terminated adduct material being prepared by reacting a polyamine with a long chain hydrocarbon material or a halogenated derivative thereof to form a polyalkylene amine reaction product having at least one reactive amino group, and then reacting said polyalkylene amine reaction product with a $C_5$-$C_9$ lactone monomer at a temperature of from about 30° to about 200° C. for a period sufficient to effect ring opening polymerization of said $C_5$-$C_9$ lactone, said polyamine being selected from the group consisting of amines of about 2 to about 60 total carbon atoms and about 1 to 12 nitrogen atoms in the amine molecule, said long chain hydrocarbon material or said halogenated derivative thereof comprising a major molar amount of $C_2$ to $C_{10}$ monoolefin and having a number average molecular weight of from about 300 to about 10,000, said hydroxyl terminated adduct material containing the unit

where m, which represents the degree of polymerization of said $C_5$-$C_9$ lactone, has an average value of from about 0.2 to about 100, and z is 4 to 8.

2. An oleaginous composition according to claim 1, wherein said $C_5$-$C_9$ lactone monomer is E-caprolactone.

3. A fuel oil composition comprising a major amount of fuel oil and from about 0.001 to about 0.5 wt. %. of a hydroxyl terminated polymeric material which is an adduct of a $C_5$-$C_9$ lactone and a polyalkylene amine material, said adduct being formed by reacting a $C_5$-$C_9$ lactone with a polyalkylene amine at a temperature of from about 30° to about 200° C. for a period sufficient to effect ring opening polymerization of said $C_5$-$C_9$ lactone, said polyalkylene amine, in turn, being formed by reacting an olefin polymer material comprising a major molar amount of $C_2$-$C_{10}$ monoolefin and having a number average molecular weight of about 300 to about 10,000 or a halogenated derivative thereof with an amine compound that is reactive therewith to add amino groups onto said olefin polymer material, said amine compound being selected from the group consisting of amines of about 2 to about 60 total carbon atoms and about 1 to 12 nitrogen atoms in the amine molecule, and said adduct containing the unit

where z is a number of from 4 to 8 and m, which represents the degree of polymerization of said $C_5$-$C_9$ lactone, has an average value of from about 0.2 to about 100.

4. A fuel oil composition according to claim 3, comprising a major amount of fuel oil and from about 0.1 to about 0.5 wt. % of said hydroxyl terminated polymeric adduct material, wherein said $C_5$-$C_9$ lactone is a E-caprolactone.

5. A fuel oil composition according to claim 3, wherein said olefin polymer that is used in the preparation of said hydroxyl terminated polymeric adduct is selected from polyisobutylene and halogenated polyisobutylene.

6. A fuel oil composition according to claim 5, wherein said amine compound is an aliphatic saturated amine having the formula

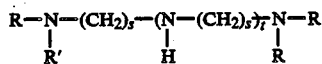

wherein R and R' independently are selected from the group consisting of hydrogen, $C_1$ to $C_{25}$ straight or branched chain alkyl radicals, $C_1$ to $C_{12}$ alkoxy $C_2$ to $C_6$ aldylene radicals, and $C_1$ to $C_{12}$ alkylamino $C_2$ to $C_6$ alkylene radicals; each s is the same or a different number of from 2 to 6; and t is a number of from 0 to 10, provided, however, that when t=0, at least one of R and R' must be hydrogen.

7. A fuel oil composition according to claim 6, wherein said amine compound is selected from the group consisting of 1,2-diaminoethane; 1,3-diaminopropane; 1,4-diaminobutane; 1,6-diaminohexane; diethylene amine; triethylene tetramine; tetraethylenepentamine; 1,2-propylene diamine; di-(1,2-propylene)triamine; di-(1,3-propylene) triamine; N,N-dimethyl-1,3-diaminopropane; N,N-di-(2-aminoethyl)ethylene diamine; and N-dodecyl-1,3-propane diamine.

8. A fuel oil composition according to claim 5, wherein said amine compound is selected from the group consisting of alicyclic diamines, imidaozolines, morpholines, and N-aminoalkyl piperazines of the general formula:

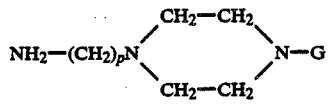

wherein G is selected from the group consisting of hydrogen and omega-(nontertiary) aminoalkylene radicals of 1 to 3 carbon atoms, and p is a number from 1 to 4.

9. A fuel oil composition according to claim 3, wherein said amine compound is a mixture of poly(ethyleneamines) averaging about 5 to 7 nitrogen atoms per molecule.

10. A fuel oil composition according to claim 3, wherein said amine compound is a polyoxyalkylene polyamine having the formulae:

NH$_2$—alkylene—(O-alkylene)$_m$—NH$_2$ where m has a value of about 3 to 70; or R(alkylene—(O-alkylene)$_n$—NH$_2$)$_a$ where n has a value of about 1 to 40 with the provision that the sum of all the n's is from about 3 to about 70, R is a substituted saturated hydrocarbon radical of up to 10 carbon atoms, wherein the number of substituents on the R group is represented by the value of "a", which is a number of from 3 to 6.

11. A fuel oil composition according to claim 3, wherein the average value of m is from about 1 to 20, and wherein said olefin polymer has a number average molecular weight in the range of from about 700 to about 5,000.

12. An oleaginous compound comprising an oleaginous fuel material and an oil soluble dispersant comprising the oil soluble product of a reaction mixture comprising as reactants:
(a) at least one amino group containing material formed by reacting an olefin polymer of about C$_2$ to C$_{10}$ monoolefin having a molecular weight of about 300 to 10,000 or a halogenated derivative thereof with an amine having from about 2 to about 60 total carbon atoms and from 1 to about 12 nitrogen atoms in the amine molecules, and
(b) at least one C$_5$–C$_9$ lactone, wherein said C$_5$ to C$_9$ lactone has undergone ring opening polymerization, wherein there are, on the average, 0.2 to 100 molar proportions of reactant (b) per molar proportion of reactant (a) in said oil soluble reaction product, and wherein said reactant (a) is capable of initiating ring opening polymerization of said reactant (b) when said reaction mixture is raised to a temperature of from about 30° to about 200° C.

13. An oleaginous composition according to claim 12, wherein said reactant (b) is E-caprolactone, and wherein said molar proportion of E-caprolactone per molar proportion of said reactant (a) is from about 1 to about 20.

14. A composition according to claim 13, wherein said amine is an aliphatic saturated amine having the general formula:

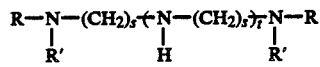

wherein R and R' independently are selected from the group consisting of hydrogen, C$_1$ to C$_{25}$ straight or branched chain alkyl radicals, C$_1$ to C$_{12}$ alkoxy C$_2$ to C$_6$ alkylene radicals and C$_1$ to C$_{12}$ alkylamino C$_2$ to C$_6$ alkylene radicals; each s is the same or a different number of from 2 to 6; and t is a number from 0 to 10, provided, however, that when t=0, at least one of R and R' is hydrogen.

15. A composition according to claim 13, wherein said amine is a mixture of poly(ethyleneamines) averaging about 5 to about 7 nitrogen atoms per molecule).

16. A fuel oil composition comprising fuel oil and an oil soluble reaction product useful as a fuel oil additive, said oil soluble reaction product having been prepared by reacting:
(a) polymer of C$_2$ to C$_{10}$ monoolefin of 700 to 5,000 molecular weight or a halogenated derivative thereof, and
(b) amine containing 2 to 60 carbon atoms and 1 to 12 amino groups, further reacted at a temperature of from about 30° to about 200° C. with
(c) C$_5$–C$_9$ lactone for a period of time sufficient to effect ring opening polymerization of said lactone such that there are, on the average, from about 0.2 to about 100 molar proportions of lactone per molar proportion of the product obtained by the reaction of (a) with (b) in said oil soluble reaction product.

17. A fuel oil composition according to claim 16, wherein (c) is caprolactone, and wherein there are 1 to 20 molar proportions of caprolactone per molar proportion of product obtained by the reaction of (a) with (b) in said oil soluble reaction product.

18. A fuel oil composition according to claim 17, wherein said amine is an aliphatic saturated amine having the general formula:

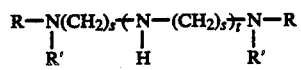

wherein R and R' independently are selected from the group consisting of hydrogen, C$_1$ to C$_{25}$ straight or branched chain alkyl radicals, C$_1$ to C$_{12}$ alkoxy C$_2$ to C$_6$ alkylene radicals, and C$_1$ to C$_{12}$ alkylamino C$_2$ to C$_6$ alkylene radicals; each s is the same or a different number of from 2 to 6; and t is a number from 0 to 10, provided, however, that when t=0, at least one of R and R' is hydrogen.

19. A fuel oil composition according to claim 17, wherein said amine is a mixture of poly(ethyleneamines) averaging about 5 to about 7 nitrogen atoms per molecule.

20. A fuel oil composition according to claim 18, wherein (a) is polyisobutylene or halogenated polyisobutylene of about 700 to 5,000 molecular weight.

21. A fuel oil composition according to claim 17, wherein (a) is polyisobutylene or halogenated polyisobutylene of about 700 to 5,000 molecular weight.

22. An additive concentrate comprising:
(a) about 80 to 20 wt. % fuel oil; and
(b) about 20 to 80 wt. % of a polymeric C$_5$–C$_9$ lactone dispersant;
(c) said C$_5$–C$_9$ lactone dispersant being formed by reacting a C$_5$–C$_9$ lactone with an amine group-containing long chain hydrocarbon at a temperature of from about 30° to about 200° C. for a period sufficient to effect ring opening polymerization of said C$_5$–C$_9$ lactone, wherein said amine group-containing long chain hydrocarbon has been prepared by reacting an amine with a C$_2$–C$_{10}$ monoolefin polymer having a number average molecular weight of about 300 to about 10000 or halogenated derivative thereof, wherein there are, on the average, from about 0.2 to 100 molar proportions of said C$_5$–C$_9$ lactone per molar proportion of said polymeric $C_5$–$C_9$ lactone dispersant (b), and wherein said amine is selected from the group consisting of amines having about 2 to about 60 total carbon atoms and about 1 to about 12 nitrogen atoms in the amine molecule.

23. A concentrate according to claim 22, wherein said dispersant is formed by reacting a polyisobutylene or halogenated polyisobutylene with a polyamine having 2 to 12 nitrogen atoms, and then reacting the resulting product with caprolactone.

* * * * *